United States Patent
Francois et al.

(10) Patent No.: US 8,059,722 B2
(45) Date of Patent: Nov. 15, 2011

(54) METHOD AND DEVICE FOR CHOOSING A MODE OF CODING

(75) Inventors: Edouard Francois, Bourg des Comptes (FR); Dominique Thoreau, Cesson-Sévigné (FR); Anne Lorette, Thorigné-Fouillard (FR)

(73) Assignee: Thomson Licensing (FR)

( * ) Notice: Subject to any disclaimer, the term of this patent is extended or adjusted under 35 U.S.C. 154(b) by 1799 days.

(21) Appl. No.: 11/174,165

(22) Filed: Jul. 1, 2005

(65) Prior Publication Data

US 2006/0039479 A1 Feb. 23, 2006

(30) Foreign Application Priority Data

Jul. 6, 2004 (FR) ..................................... 04 51447

(51) Int. Cl.
*H04N 7/12* (2006.01)
*H04N 11/02* (2006.01)
*H04N 11/04* (2006.01)
*G06K 9/46* (2006.01)

(52) U.S. Cl. ......... 375/240.24; 375/240.16; 375/240.12; 375/240.06; 382/239

(58) Field of Classification Search ............... 375/240.24
See application file for complete search history.

(56) References Cited

U.S. PATENT DOCUMENTS

| | | | | |
|---|---|---|---|---|
| 5,686,963 | A * | 11/1997 | Uz et al. | ................... 375/240.06 |
| 6,954,502 | B2 | 10/2005 | Lainema | |
| 2002/0039386 | A1 * | 4/2002 | Han et al. | ................... 375/240.16 |
| 2003/0035477 | A1 | 2/2003 | Sekiguchi | |
| 2005/0053299 | A1 * | 3/2005 | Fuchs et al. | ................... 382/239 |
| 2007/0140337 | A1 * | 6/2007 | Lim et al. | ................... 375/240.12 |

FOREIGN PATENT DOCUMENTS

| | | |
|---|---|---|
| EP | 0615384 | 9/1994 |
| FR | 2846835 | 5/2004 |
| JP | 7298265 | 11/1955 |

(Continued)

OTHER PUBLICATIONS

Choi et al., "Fast Motion Estimation and Mode Decsion with Variable Motion Block Sizes", Proceedings of SPIE vol. 5150, pp. 1561-1572, 2003.*

(Continued)

*Primary Examiner* — Christopher S Kelley
*Assistant Examiner* — Hee-Yong Kim
(74) *Attorney, Agent, or Firm* — Jack Schwartz and Associates, PLLC

(57) ABSTRACT

The present invention relates to a method and a device for choosing a mode of coding from among a plurality of modes of coding for a subset of blocks included in a set of blocks. An energy function over the set of blocks for each of the modes of coding is calculated and calculation elements of the energy function are stored for at least the subset of blocks. A first mode of coding, minimizing the energy function over the set of blocks is chosen. The energy function over the subset of blocks for each of the modes of coding is thereafter calculated by using the calculation elements stored for the subset of blocks and by said subset, of a cost of coding for the modes of coding distinct from the first mode of coding. The choice of a mode of coding minimizing the energy function over the subset is then effected.

12 Claims, 3 Drawing Sheets

FOREIGN PATENT DOCUMENTS

| | | |
|---|---|---|
| JP | 8046968 | 2/1996 |
| JP | 11164305 | 6/1999 |
| JP | 2003533142 | 11/2003 |
| JP | 2005268879 | 9/2005 |
| JP | 8223578 | 8/2006 |

OTHER PUBLICATIONS

Richardson, "H.264 and MPEG-4 Video Compression", John Wiley & Sons, 2003.*

Search Report.

* cited by examiner

METHOD AND DEVICE FOR CHOOSING A MODE OF CODING

This application claims the benefit, under 35 U.S.C. 119, of France patent application No. 0451447 filed Jul. 6, 2004.

FIELD OF THE INVENTION

The present invention relates to a method for choosing the modes of coding of the blocks of an image divided into blocks, from among a plurality of modes of image compression coding. The method consists in iteratively choosing a mode of coding so as to code a set of blocks and then refining this choice over subsets of blocks of the said set of blocks. The refinement may reproduce itself iteratively over the subsets thus processed.

BACKGROUND OF THE INVENTION

The context of the invention is therefore compression, in particular video compression, based on blockwise coding schemes, of MPEG-2, MPEG-4, part 2 or 10 type. These compression schemes operate on base entities called macroblocks. In what follows, the term block may denote groups of any size of smaller blocks and hence in particular may denote macroblocks. These schemes implement a coding decision method the aim of which is to choose for each macroblock the coding mode which appears best suited. This choice may be made a posteriori, that is to say by evaluating all the possible modes, in particular by calculating cost of coding and distortion. The mode of coding exhibiting the best bit rate-distortion compromise is then chosen. The known coding decision methods operate in a causal manner: once a decision has been taken in respect of a macroblock, we go to the next macroblock. This is done in the order of scanning of the image.

The known methods thus take no account of the impact of the decisions on the future macroblocks. This has negative consequences on the map of the modes chosen over the whole of an image which may exhibit a degree of inhomogeneity. The block effects are then visible. This also leads to negative consequences on the cost of coding since the cost of coding of a macroblock is generally very dependent on the choice of the modes of coding of the neighbouring macroblocks, in particular situated above and to the left in the case of a left to right and top to bottom scan. The decision taken regarding a macroblock may be the best for this macroblock, but since it affects the following macroblocks, its consequence may be the choosing of a nonoptimal decision for later macroblocks. Approaches with several iterations making it possible to reconsider the decisions taken previously may be used. The amount of calculation is then high. Moreover, these approaches make it possible to avoid a nonoptimal decision for the later macroblocks only by adopting a so-called stochastic relaxation strategy which involves an amount of calculation that is incompatible with, in particular, video coding.

Other approaches based on the calculation of a collection of modes of coding over a set of macroblocks presupposes the consideration of all the possible combinations of modes of coding, this obviously being extremely expensive in terms of calculation time.

SUMMARY OF THE INVENTION

The present invention proposes a coding decision method which does not give rise to the defects mentioned hereinabove. Thus, a coding decision method according to the invention makes it possible to obtain a compressed image of better quality relative to the conventional solution mentioned hereinabove, while optimizing the coding cost.

The present invention relates to a method for choosing a mode of coding, from among a plurality of modes of compression coding of images divided into blocks, so as to code a subset of blocks included in a set of blocks, the said method including the steps of calculation of an energy function over the said set of blocks for each of the modes of coding, of storage of calculation elements of the said energy function for at least the subset of blocks, of choice of a first mode of coding minimizing the energy function over the said set of blocks, of calculation of the energy function over the said subset of blocks for each of the modes of coding, the said calculation of the energy function using the calculation elements stored for the subset of blocks and implementing a step of estimation, over a neighbourhood of the said subset, of a cost of coding for the modes of coding distinct from the first mode of coding and, of choice of a second mode of coding minimizing the energy function over the subset.

Specifically, the multiscale approach proposed by the invention uses a choice of a mode of coding for a set of blocks so as thereafter to decide the mode of coding for a subset of the set of blocks. This enables the decision to be made homogeneous over the set of blocks. This approach also makes it possible to approach nearer to the global minimum where the set of blocks of the energy function and hence, in particular, to optimize the cost of coding over the set of blocks. It goes without saying that the first and second modes of coding may be distinct or be the same, given that one and the same mode of coding can minimize the energy function for the set of blocks and for the subset of blocks.

In an embodiment, the set of blocks is a group of $2^m*2^n$ blocks, the subset being a group of $2^{n-1}*2^{n-1}$ blocks.

This embodiment is especially advantageous within the framework of image codings, in particular according to the MPEG standards, where the blocks are in particular grouped into macroblocks, which may also be grouped together, in particular into groups of $2^n \times 2^n$ blocks.

In an embodiment, the neighbourhood is the group of the blocks below and to the right of the subset of blocks.

This embodiment is especially advantageous within the framework of image codings, in particular according to the MPEG standards, where the blocks are scanned, for the coding, from left to right and from top to bottom.

In an embodiment, the calculation elements are a distortion and a cost of coding for each subset of blocks.

This characteristic reflects the nature of an energy function as calculated according to the invention. The distortion represents the error observed between the coded image and the uncoded original image. The cost of coding generally represents the number of bits necessary for the coding of the image. These calculation elements are stored so as to be able to be recalled by the step of calculation of the energy function for the subset of macroblocks.

In an embodiment, the step of choice of a mode of coding includes a substep of choice of a parameter of the mode of coding.

This characteristic makes it possible to widen the application of the invention to a choice of parameters specific to the mode of coding, for example the choice of a vector.

In an embodiment, the method according to the invention is iteratively repeated over a series of subsets of sets of blocks.

This embodiment is especially useful for MPEG coding. The set of blocks may for example be of the largest possible size $2^n$ of blocks in the image to be coded, the next subset being of size $2^{n-1}$. According to the method of the invention, a mode of coding is then chosen for four subsets. Then each subset of size $2^{n-1}$ becomes the set of blocks, the subset then being of size $2^{n-2}$ and so on and so forth.

The invention also relates to a device for implementing the method as described earlier.

The invention also relates to a compressed image obtained by iteratively implementing a method according to the invention (starting from a splitting into blocks of very large size—typically 128*128 pixels—of the complete image).

BRIEF DESCRIPTION OF THE DRAWINGS

Other characteristics and advantages of the present invention will become apparent on reading the description of various embodiments, the description being made with reference to the appended drawings in which.

DETAILED DESCRIPTION OF PREFERRED EMBODIMENTS

Figure 1:
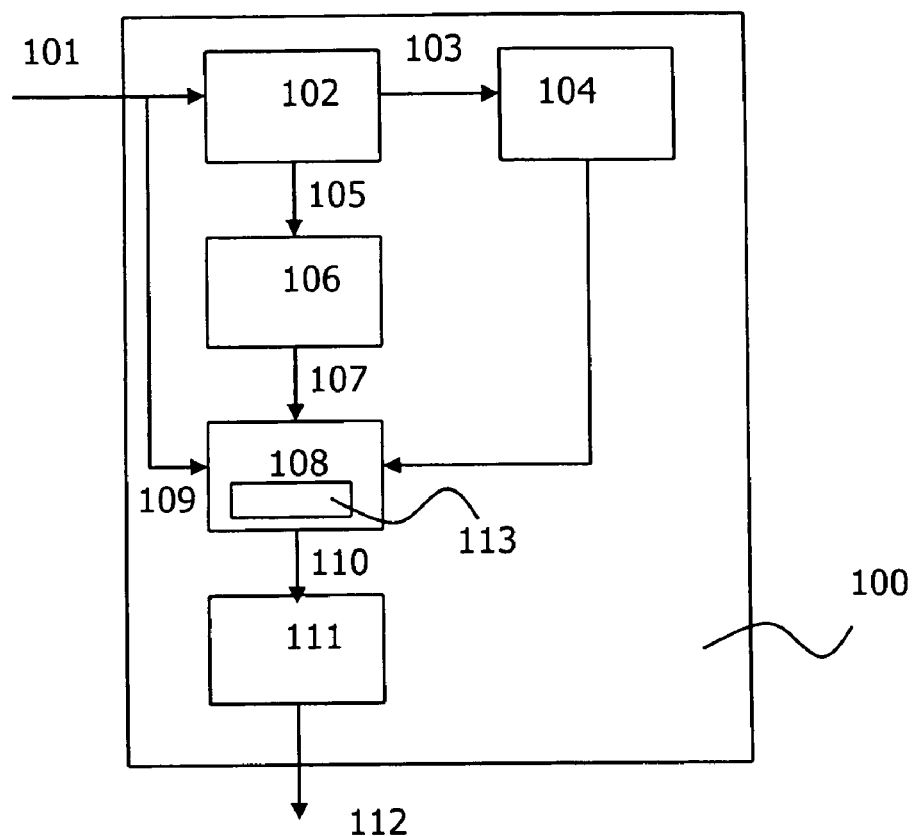
FIG. 1 is a diagram of a device according to the invention.

As represented in FIG. 1, a device 100 according to the invention includes a calculation module 102 for calculating an energy function 105 over a set 101 of blocks for each of the modes of coding. A memory 104 makes it possible to store calculation elements 103 of the energy function 105 for at least one subset of blocks 109.

The energy function, represented by a single reference 105 for reasons of clarity, is calculated for several modes of coding. Thus, as many values of the energy function, referenced 105, are stored as coding modes that are evaluated.

The device 100 includes a module 106 for choosing a mode of coding, termed the first mode of coding 107, minimizing the energy function 105 over the said set of blocks 101.

The choice of a mode of coding consists in searching for the set of modes of coding M and the set of their associated parameters P minimizing the energy function 105, denoted E in the equations:

$$\mathrm{Min}_{M,P}\, E(M,P/I_{cur}, I_{ref})$$

where $I_{cur}$ designates the current image, $I_{ref}$ designates the images serving as references for the temporal prediction, $M=\{m_1, m_2, \ldots, m_N\}$ is the set of modes of coding of the N macroblocks, mi being able to take its values from among the set of Q coding modes permitted $T=\{t_1, t_2, \ldots, t_Q\}$, P is the set of parameters associated at each site s with its mode ms. This may be a matter of the direction of spatial prediction for the Intra mode of coding, of motion vectors or of bidirectional weighting coefficients for an Inter mode.

The energy function E is a sum of elementary functions over the set of blocks. As signalled previously, these elementary functions depend on the neighbourhood of the block.

Figure 2A:
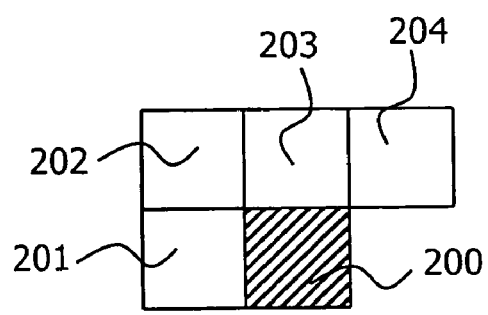
FIG. 2a and FIG. 2b present the role of a neighbourhood of a block or of a macroblock in the calculation of a coding cost.
Figure 2B:
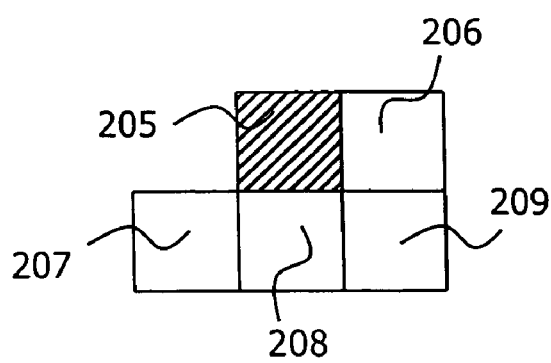

As represented in FIG. 2a, in a coding scheme carried out with a left to right and top to bottom scan, such as for example an MPEG-4 part 10 coding scheme, the elementary function calculated over the block 200 depends on the coding modes chosen within the neighbourhood consisting of blocks 201 to 204. In a complementary manner, as represented in FIG. 2b, each of the elementary functions calculated for blocks 206 to 209 depend, in particular, on the coding mode chosen for block 205.

The sum of elementary functions may then be written:

$$E(M,P/I_{cur}, I_{ref})=\Sigma s \in S\, E_s(m_s, p_s(m_s)/m_r, p_r(m_r)),\, r \in V_s, I_{cur}, I_{ref})$$

where S is the set of the positions (or sites) of the N macroblocks of the image and $V_s$ designates the neighbourhood of the site s, for example blocks 201 to 204 in FIG. 2a.

The function $E_s$ may take several forms. In an a posteriori approach, it may take the following form, the notation for which has been simplified by omitting the conditional dependencies:

$$E_s(m)=D(m,p(m))+\lambda.C(m,p(m))$$

where D is a measure of distortion and C is a measure of coding cost, $\lambda$ is a parameter determined or calculated, conventionally as a function of the quantization stepsize of the block.

The choice of the first mode of coding 107 over the set of blocks is determined by the mode minimizing the function $E_s(m)$ above.

The calculation elements D and C, referenced 103 in FIG. 1 are stored for each subset of blocks, for each mode evaluated. According to the invention at least the calculation elements 103 for the blocks of the subset 109 for which a coding mode 112 must be chosen are stored.

The device 100 thereafter therefore has the possibility of dealing with a subset 109 of the set 101 of blocks.

It thus includes a calculation module 108 for calculating the energy function 110 over the said subset 109 of blocks for each of the coding modes m.

Figure 3:
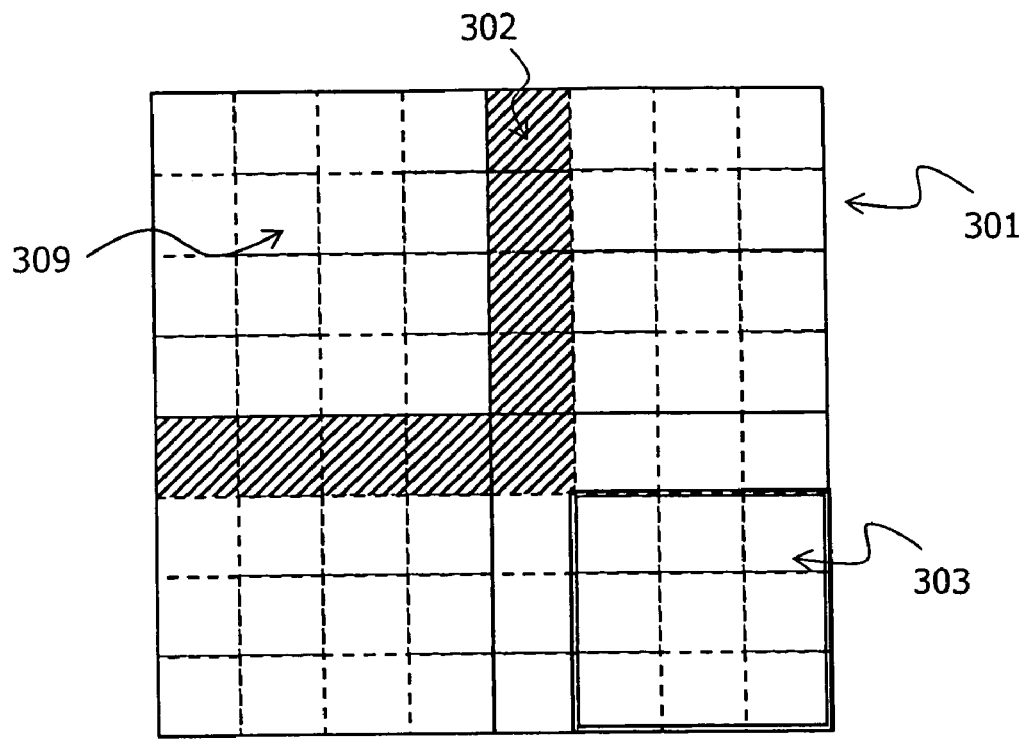
FIG. 3 illustrates the manner of operation of the invention over a set of macroblocks.

FIG. 3 thereafter illustrates the manner of operation of the invention. A first mode of coding has been chosen for the set of blocks 301. It is, for example, for the subset 309 of 4×4 blocks, that the energy function 110 is thereafter calculated. Any other subset, for example that of size 3×3 and denoted 303 in FIG. 3, of the set 301 may also be selected according to the method of the invention. All other sizes, for example 3×2 etc., may also be implemented in the invention.

According to FIG. 1, the module 108 for calculating the energy function 110 calls upon the calculation elements 103 stored for the subset 109 of blocks. The calculation module 108 also includes an estimation module 113 for estimating, over a neighbourhood of the subset, a cost of coding for the coding modes distinct from the first coding mode 107.

According to FIG. 3, the neighbourhood of the subset is the neighbourhood 302 defined by the blocks situated at the bottom and to the right of the subset 309 of blocks.

Specifically, as illustrated in FIG. 2b, the change of mode for a block 205 situated at a site s also alters the energy of the future blocks 206 to 209. The future blocks are denoted $F_s$ in the equations. If at a site s, a mode m is replaced with a mode m', the variation in energy resulting therefrom is as follows:

$$\Delta E=E_s(m',p_s(m'))-E_s(m,p_s(m))+\Sigma r \in F_s(E_r(m_r, p_r(m_r)/m', p_s(m'))-E_r(m_r, p_r(m_r)/m,p_s(m)))$$

The first two terms represent the change of the energy function depending on the past blocks, the third term represents the change of the energy function engendered on the energy function of the future blocks.

In the conventional monoscale causal approaches, the choice of the mode of coding is then effected by measuring the variation of the energy function of the macroblock s, that is to say the first two terms without taking into account the energy variations involved on the future blocks.

It is observed that for small to medium quantization stepsizes in the image divided into blocks, it can be considered that the impact for a block of a change of mode of an earlier block of the neighbourhood has no bearing on the distortion but only on the coding cost. Specifically, a block reconstructed after dequantization is not too far from the source block for the small to medium ranges of quantization stepsize. In this case, the distortion need not be recalculated. Thus, for each subset of blocks, the distortions for each mode are calculated onwards of the coarsest scale. In this case, the storage of the calculation elements 103 makes it possible to call upon the calculation elements 103 representing the distortion D easily without having to recalculate them.

As a result of working on subsets of blocks and of necessarily having the same mode within a subset, the cost of coding does not change for the blocks situated within the subset of blocks. It is therefore observed that for a given scale, the coding cost variations generated by the change of coding mode for the subset 309 of blocks are sensible only for the blocks situated in the neighbourhood 302 of the subset 309. This makes it possible to considerably decrease the amount of calculations performed since only the variations in coding cost for the blocks of the neighbourhood 302 of the subset 309 of blocks are calculated. The other coding costs for the blocks internal to the subset are in fact stored as seen previously in the guise of calculation element 103. Specifically, referring to FIG. 3, a conventional calculation of the coding costs gives rise to 16+9 calculations whereas the invention makes it possible to carry out just 9.

The device finally includes a module 111 for choosing a mode of coding 112 minimizing the energy function 110 calculated by the calculation module 108 over the subset 109.

The multiscale approach proposed according to the invention makes it possible more easily to closely approach the optimization of the coding over the image. Specifically, a multiscale approach makes it possible to smooth the function to be minimized all the more significantly when the method is carried out with a set of blocks of large scale.

Thus, at a sufficiently high scale for the set of starting blocks for the method, the function becomes convex and the attaining of the global minimum is readily achieved.

Figure 4:
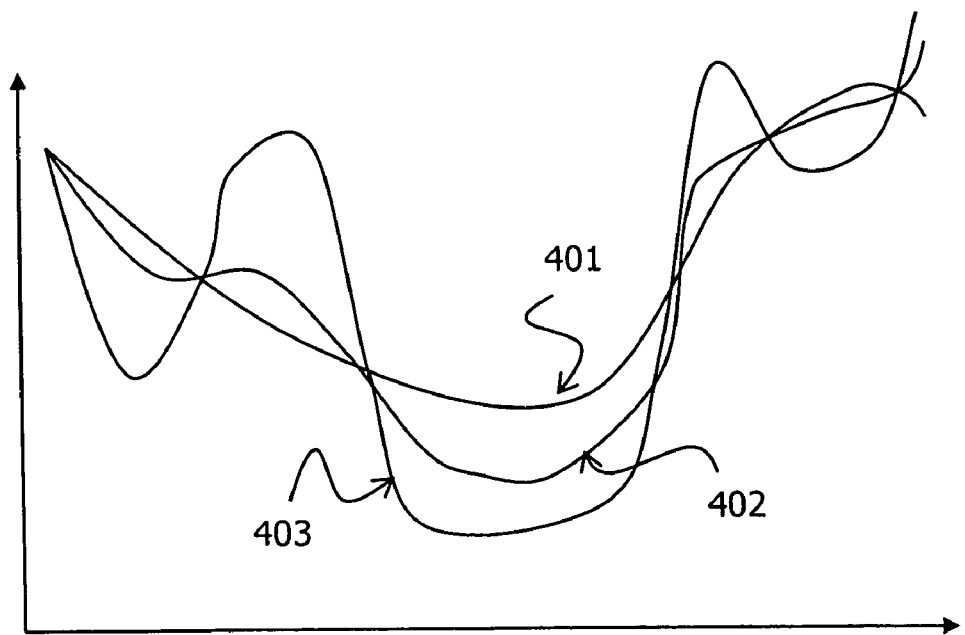
FIG. 4 represents an energy function with various scales.

FIG. 4 illustrates this in the simple case of an energy function calculated over a single dimension, for a plurality of modes represented along the abscissa. Thus, it is noted that the curve 401 of the energy function at the smallest scale exhibits several minima. Thus if we start from a poor initialization during the minimization of the energy function, we are at risk of falling into a local minimum. The curve 402 represents an intermediate scale which in addition to the global minimum exhibits less pronounced local minima. The curve 401 represents the biggest scale, this curve 401 exhibits just one minimum that will definitely be attained. As illustrated in this last figure, to determine the best collection of coding modes over an image divided into blocks, it is necessary to minimize an energy function with several dimensions, in particular the number of blocks of the image, the number of modes per block, the spatio-temporal prediction space, by configuration that finding the minimum of the energy function. When using the causal approach, hence at small scale, we end up obtaining affords a local minimum which may be far from the global minimum of the energy function. Thus, the invention makes it possible to approach nearer to the minimization of the energy function for the coding of an entire image since it is possible to define the set of blocks as being the entire image.

Figure 5A:
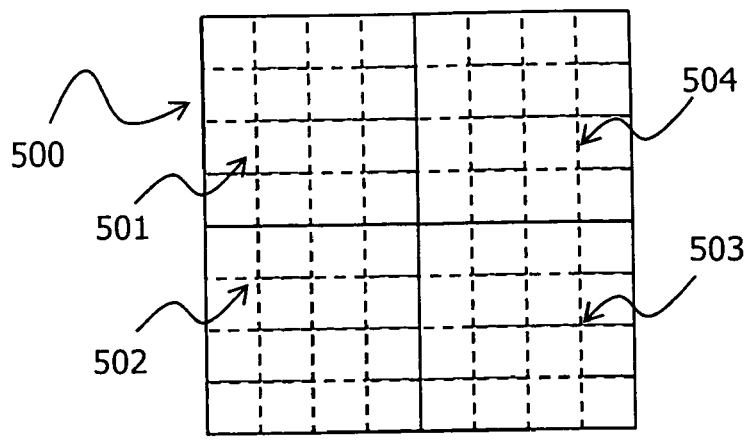
FIG. 5a to FIG. 5c illustrate the conduct of a method according to the invention over a set of macroblocks.
Figure 5B:
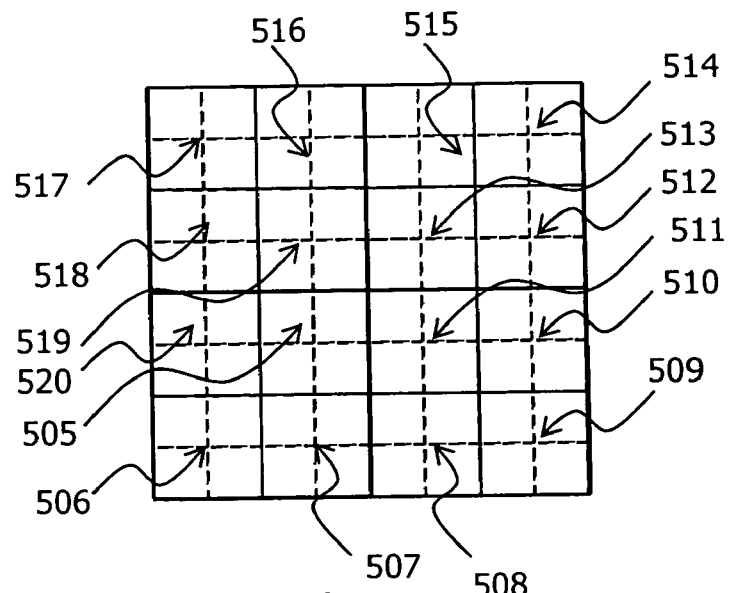
Figure 5C:
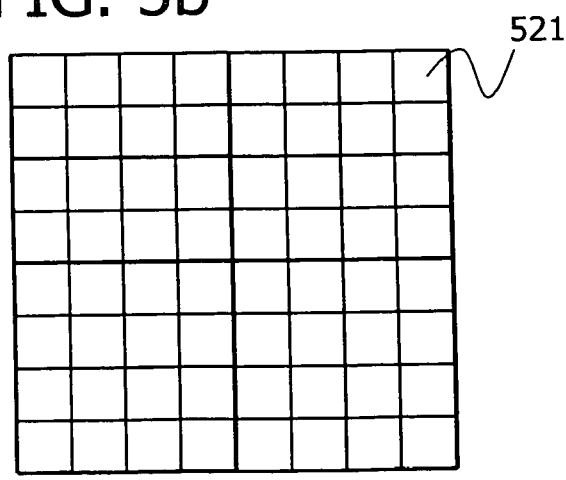

With reference to FIG. 5, the method according to the invention is advantageously iteratively repeated over a plurality of scales for the set and the subset of blocks so as to obtain optimization of the collection of coding modes over the totality of an image. According to this iteration the subset of a previous step becomes the set of the next step and so on and so forth. Advantageously, the coarsest scale is the entire image.

According to this iteration principle, the minimization of the energy function is calculated on a first scale represented in FIG. 5a by a set 500 of blocks of 8×8 blocks. For this first scale, the subsets 501 to 504 are of size 4×4. For the second scale represented in FIG. 5b, the subsets 501 to 504 of the previous scale have each become a set of blocks for carrying out a method according to the invention. The subsets are now the groups 505 to 520 of 2×2 blocks. Finally in the third scale, the subsets are now the blocks 521 themselves. Thus the blocks are grouped into subsets of $2^n \times 2^n$ blocks. The blocks of each subset necessarily all have the same mode of coding.

The invention makes it possible to undertake the optimization from the coarsest scale. A causal scale is used to traverse each of the subsets within a set. According to the invention, the mode which generates the lowest energy is sought for each subset at a given scale K. For example, in FIG. 5, the set 500 of scale K+1 is used to determine the mode which generates the lowest energy for each of subsets 501 to 504 of scale K and so on. Once scale K has been processed, we have available for the lower scale K−1 an initial map of the modes for each new set of scale K. For each subset of scale K−1, we then search for the mode which achieves the greatest energy drop. Once scale K−1 has been processed we go to scale K−2 and so on and so forth down to scale 0 where, for example, a single block constitutes the subset.

The invention may also be applied to optimize the energy function as a function of the parameters of the coding modes. Two approaches may be considered. Either the parameters of each subset of blocks may be different. Thus the mode of coding of a subset is for example the Inter mode with a motion vector parameter for each subset of blocks. Or we operate for a given parameter P in the same way as for the modes by processing a subset $P_n$ of the parameter P at each scale.

In both cases, the estimation of the parameter P and if necessary of the $P_n$ may be done, in a totally independent manner. For example, it is possible to undertake a multiscale motion estimation over the whole of the image prior to the implementation of the coding decision device. This solution has the advantage of being less expensive calculationally than the solution of simultaneous estimation of the sets $M_n$ and $P_n$.

The invention is not limited to the embodiments described and the person skilled in the art will recognize the existence of various alternative embodiments such as for example the possibility of envisaging various types of neighbourhood for the calculation of the costs of coding of the neighbouring blocks. It may also be noted that the coding costs may be estimated by rigorous calculation or by an approximate calculation using known approximation techniques.

What is claimed is:

1. Method for choosing a mode of coding, from among a plurality of modes of compression coding of images divided into blocks, so as to code a subset of blocks included in a set of blocks, the method including at least two iterative executions of the steps of:

calculation of an energy function over the set of blocks using a processor for each of the modes of coding, storage of calculation elements of the energy function for at least the subset of blocks, choice of a first mode of coding minimizing the energy function over the set of blocks, calculation of the energy function over the subset of blocks for each of the modes of coding, the calculation of the energy function using the calculation elements stored for the subset of blocks and implementing a step of estimation, over a neighbourhood of the subset, of a cost of coding for the modes of coding distinct from the first mode of coding and, choice of a second mode of coding minimizing the energy function over the subset~wherein the subset of blocks of the first execution is used as the set of blocks of the second execution.

2. Method according to claim 1, in which the set of blocks is a group of $2^n*2^n$ blocks, the subset being a group of $2^{n-1}*2^{n-1}$ blocks.

3. Method according to claims 1, in which the neighbourhood is the group of the blocks below and to the right of the subset of blocks.

4. Method according to claim 1, in which the calculation elements are a distortion and a cost of coding for each subset of blocks.

5. Method according to of claim 1, in which the step of choice of a mode of coding includes a substep of choice of a parameter of the mode of coding.

6. Method according to claim 1, iteratively repeated over a series of subsets of sets of blocks.

7. Method of coding of a video image implementing a plurality of modes of coding, wherein it includes a phase of choice of mode of coding according to the method of claim 1.

8. Device intended to effect a choice of a mode of coding from among a plurality of modes of coding for a subset of blocks included in a set of blocks, the device including:

a calculation module for calculating an energy function over the set of blocks for each of the modes of coding, a memory for storing calculation elements of the energy function for at least the subset of blocks, a module for choosing a first mode of coding minimizing the energy function over the set of blocks, a calculation module for calculating the energy function over the subset of blocks for each of the modes of coding, the said module for calculating the energy function calling upon the calculation elements stored for the subset of blocks and including an estimation module for estimating, over a neighbourhood of the subset, a cost of coding for the modes of coding distinct from the first mode of coding, a module for choosing a second mode of coding minimizing the energy function over the subset, wherein the device performs an iterative operation with at least two iterations, wherein the subset of blocks of a first iteration are used as a set of blocks for a second iteration.

9. Device according to claim 8, in which the set of blocks is a group of $2^n*2^n$ blocks, the subset being a group of $2^{n-1}*2^{n-1}$ blocks.

10. Device according to claim 8, in which the neighbourhood is the group of the blocks below and to the right of the subset of blocks.

11. Device according to claim 8, in which the calculation elements are a distortion and a cost of coding for each subset of blocks.

12. Device according to claim 8, in which at least one of the modules for choosing a mode of coding includes a submodule for choosing a parameter of the mode of coding.

\* \* \* \* \*